United States Patent [19]

Faehnle

[11] Patent Number: 4,589,354

[45] Date of Patent: May 20, 1986

[54] APPARATUS FOR THE RECOVERY OF GASES FROM WASTE MATERIALS

[75] Inventor: Erich Faehnle, Aalen, Fed. Rep. of Germany

[73] Assignee: PKA Pyrolyse Kraftanlagen GmbH, Aalen, Fed. Rep. of Germany

[21] Appl. No.: 683,375

[22] Filed: Dec. 19, 1984

[30] Foreign Application Priority Data

Dec. 22, 1983 [DE] Fed. Rep. of Germany ....... 3346338

[51] Int. Cl.[4] .......................... A47J 36/24; F27B 7/24

[52] U.S. Cl. .................................... 110/246; 432/115; 432/246

[58] Field of Search ................ 110/246; 432/105, 107, 432/112, 113, 114, 103, 115

[56] References Cited

U.S. PATENT DOCUMENTS

| | | | |
|---|---|---|---|
| 1,477,823 | 12/1923 | Grindle | 432/107 |
| 2,057,099 | 10/1936 | Ingraham | 432/114 |
| 2,151,320 | 3/1939 | Forni | 432/246 |
| 2,826,403 | 3/1958 | Moklebust | 432/115 |
| 3,940,239 | 2/1976 | Rossi et al. | 432/115 |
| 4,295,824 | 10/1981 | Wens | 432/115 |
| 4,338,868 | 7/1982 | Lientz | 432/246 |
| 4,376,343 | 3/1983 | White et al. | 432/107 |
| 4,427,376 | 1/1984 | Etnyre et al. | 432/114 |

*Primary Examiner*—Henry C. Yuen

*Attorney, Agent, or Firm*—Walter H. Schneider

[57] ABSTRACT

The disclosure relates to a rotating pyrolysis drum for the thermal treatment of waste materials, such as domestic or industrial garbage or the like, with respectively one heated gas collecting chamber for addition and one heated gas collecting chamber for withdrawal, being provided at pertaining end faces of the drum, which chambers are connected to one another via bores in the end faces and by tubes extending through the interior of the drum. At least one seal assembly is arranged between the stationary heated gas collecting chambers and the drum. A seal disc is provided on the circumferential wall of a hollow connection member at the end face of the drum at the inlet side and, respectively, at the outlet side for pyrolysis residues and/or another rotating part of the drum. At the two end faces of the seal disc are arranged contact rings which are slid with play over the connection member and/or the other rotating part and these sealingly contact such end faces. The contact rings are respectively provided on their circumference with seals which act between them and a surrounding housing part.

4 Claims, 4 Drawing Figures

APPARATUS FOR THE RECOVERY OF GASES FROM WASTE MATERIALS

BACKGROUND OF THE INVENTION

Field of the Invention

The present invention relates to improvements in or relating to the treatment of waste or refuse in a rotary drum, for the recovery of useful gaseous components from material which is being treated. More particularly, the present invention relates to a rotary drum or similar vessel which can be rotated, for the pyrolysis or similar thermal treatments of the material to be handled in the vessel. The vessel is associated with a collecting chamber, for heated or heating gases, which serves in the addition and in the removal of heating gases, on each end of the vessel, with the chambers being in communication by way of heated gas ducts traversing the interior of the vessel, and by way of passages in the end walls of the vessel. The assembly also includes a seal arrangement between pertaining fixed collecting chambers and the vessel. Such an arrangement is also described in German Patent No. 2,713,031.

A drum of this type serves to recover useful gas from refuse material by pyrolysis. For this, comminuted material, preferably material which has been granulated, is introduced into the gastight and indirectly heated pyrolysis drum. The gas is produced at temperatures of approximately 450° to 550° C. under the exclusion of oxygen, and the gas is separated from the residues, such as ashes and other small particles. The gas, hereinafter generally referred to as pyrolysis gas, is further treated in other processing sequences, such that it can be used, for example, in the provision of power in gas turbines and gas motors or engines. As well, such gas can be used in chemical industries as synthesis gas for new products, for utilization of contained heat values, as by-pass for boiler installations, or for the operation of block-heating power plants. Treatment of the pyrolysis gas is usually carried out at a cracking temperature of 1100° to 1200° C. Long chain carbohydrates are converted to methane and hydrogen and other simple carbohydrates under such conditions.

Heating of the drum is achieved in an indirect manner, for example, by way of gas burners or oil burners, whereby the heating gases of one heating gas collecting chamber on the one end face are passed to the drum, and are passed from there, through passages or bores, into the heating gas conduits or tubes, which tubes extend through the interior of the drum. On the other side the cooled heating gases which emanate from the tubes are collected again in a heating gas collecting chamber, from where they are removed for a renewed heating, and are subsequently passed again into the heating gas collecting chamber at the other side or end of the drum.

A problem arises with the drum when sealing it with respect to the atmosphere, and with respect to the heating gas collecting chambers, respectively. Due to the relatively rough operation and inaccuracies of tolerances, the seals are subjected to high demands, or such seals have a short durability or life span. When heated gases or air enter through such inefficient seals into the interior of the drum, this will lead to considerable reduction of the efficiency losses of the overall processing.

In addition, the high temperature differences lead to problems with respect to the sealing and various material expansions.

OBJECTS OF THE INVENTION

There has continued to remain, therefore, a need for improving the pyrolysis drum briefly described in the foregoing.

It is one object of the present invention to provide a rotating pyrolysis drum of the type briefly described in the foregoing which substantially avoids the mentioned problems.

It is also an object of the present invention to provide a rotating pyrolysis drum with an effective seal assembly.

It is further an object of the invention to provide a rotating pyrolysis drum which is adapted to accommodate various material expansion conditions.

SUMMARY OF THE INVENTION

In accordance with one aspect of the present invention these objects are attained thereby that a seal disc is arranged on the circumferential wall of a hollow connection member at each one of the end faces of the drum, i.e., at the input end and at the output end for solid residues, respectively, and/or another rotating part of the drum. The seal disc has two sides and at these, respectively, sealingly abut, with play over the connection member and/or the other rotating part, contact rings, which contact rings can be slid onto the pertaining elements. The contact rings are, respectively, provided on their circumference with seals which are effective between them and the surrounding housing part or parts.

Instead of a seal assembly comprised of simple seal rings, labyrinth seals, and the like, which are sensitive to rough operation, for example, wobbling and similar imbalances and rotational problems, can be used in accordance with the present invention, in a simple and safe manner whereby a seal is achieved between the end faces of the seal disc and the contact rings, respectively. The seal disc rotates with the pyrolysis drum, whereas the contact rings, generally, do not rotate. On the other hand, provisions can be made to have the contact rings rotate in full or in part in conjunction with the rotation of the pertaining seal ring.

Since the seal surfaces in accordance with the present invention extend in radial direction, the seal assembly is generally not affected by rotational inaccuracies and other imbalances. The seals at the outer circumferences of the contact rings are not subjected to stressing arising as a consequence of such imbalances. Furthermore they will generally be static.

Sealing of the gas collecting chambers is generally achieved by respectively one seal arrangement at or on the hollow connection member of the pyrolysis drum, and a further seal assembly, respectively in the outer region of an end face, or at the circumferential wall of the drum. The seal in accordance with one aspect of the invention can be used in the inner region at the hollow connection member, but also in exterior regions. It is important that the seals are arranged in such a way that there results a surficial sliding friction. This would lead, for example, in the event of a minor rotational unevenness of the drum, under certain circumstances to an improved sealing at the two end faces of the seal disc. It is to be ensured that the play between the contact rings and the connection member of the drum, or other rotating parts of the drum, is of such a value that no contact arises, even under high temperature conditions.

In accordance with a preferred embodiment, the respective outer contact ring is provided with an adjustment device which is effective at least in the direction of the seal disc. The adjustment device allows precise adjustment of the seal and for adjusting or alignment under operational requirements, for example, adjustment due to wear.

The adjustment device preferably includes a threaded rod which is arranged in a stationary housing part, and an adjustment member, for example, a control sleeve, is provided on the threaded rod, and the forward end of the threaded rod is adapted to act at least upon the pertaining contact ring. The forward end of the threaded rod can be directly pressed against the contact ring, or an intermediate disc can be provided.

In accordance with another preferred embodiment of the invention, the contact rings are secured against rotation by way of means which will effectively prevent rotational movements thereof.

In accordance with another preferred embodiment, the seal disc can for safety reasons additionally be furnished at its interior circumferential wall with seal rings. This will ensure that the seal retains its integrity, for example, under various expansion conditions which are due to temperature differences.

It is also preferred that for increase of the seal efficiency, at least some of the contact rings have the shape of the inverted letter "L", and the pertaining legs, L-legs hereinafter, are directed to one another, and the seal disc is positioned beneath the L-legs.

In this manner, several seals can be arranged over the width of the seal disc, on the interior circumference thereof, as well as on the outer sides of the L-legs. These seal rings can be arranged in adjacent relationship. At the same time, the surficial sliding friction at the two end faces of the seal disc is substantially retained.

A further problem with respect to the seal and various thermal expansions is pertinent with respect to the heating gas tubes per se.

It has been proposed in German Patent No. 2,723,131 to supply heat to the pyrolysis durm by means of hollow circulating vanes through which the heating gases are passed. Such an embodiment is complex, and the heat transfer is not always satisfactory.

In accordance with a further preferred embodiment of the invention, the conduits for the heating gas are in the shape of tubes. These tubes generally extend in parallel direction with respect to the longitudinal axis of the drum and from one end to the other therethrough. A sufficient number of tubes is provided, arranged about the circumference, and alongside one another. This permits a high heat transfer, and the circulating vanes are obviated because the tubes carry out the circulating function.

Under operating conditions, it has been found that due to high temperature differences and the length of the drum, cracks can arise due to stress. Thus, in a drum with a length of 10 m, expansions of 5 to 10 cm have been observed. This has lead to cracks in, or similar failures of, the drum.

In accordance with a preferred embodiment it is suggested that the tubes are fixedly arranged at one end of the drum, whereas they would be arranged at the other end of the drum in or on sleeves, so as to allow or accommodate expansion, while retaining a gastight seal. The sleeves, in turn, are fixedly arranged at that drum end.

Longitudinal fluctuations of the tubes can be accommodated without problems in this embodiment, and in such a way that cracks, breakdowns, and losses of sealing efficiency are not experienced.

The tubes may selectively be provided interiorly or may be exteriorly associated with the sleeves, with the seal assemblies being fashioned accordingly.

A high degree of operational efficiency can be attained when the garbage, or similar waste, is introduced into the pyrolysis drum under the exclusion of air. The size range of the material can be of from about 1 to about 20 mm, and this may be achieved by compacting the material in a press or similar compacting apparatus. The granulate is then introduced, via a bucketwheel input device and a feed screw, into the pyrolysis drum. A dry content of 85% can be maintained, and a good efficiency can be achieved at such a condition. Residual moisture contained in the material is taken up by the gas phase and is, furthermore, used for the subsequent treatment of the resulting pyrolysis gas. This means that this treatment does not produce waste water and nitrogenous exhaust gases.

The dry content of the waste material may be greater than 85%.

In such an event, in accordance with another preferred embodiment of the invention it is contemplated that in the feed or input region of the drum there is provided an inlet for metered addition of water or air. This will allow control of the moisture content as desired. The air may be added simultaneously, because it was found that it can be of advantage that small amounts of air are added in the pyrolysis drum. This results in combustion processes in the drum which allow an easier and more rapid attaining of the operating temperatures, and external heating energy is conserved.

DESCRIPTION OF THE DRAWINGS

In the drawings, which illustrate that which is presently regarded as the best mode of carrying out the invention.

DESCRIPTION OF THE PREFERRED EMBODIMENTS

Figure 1:
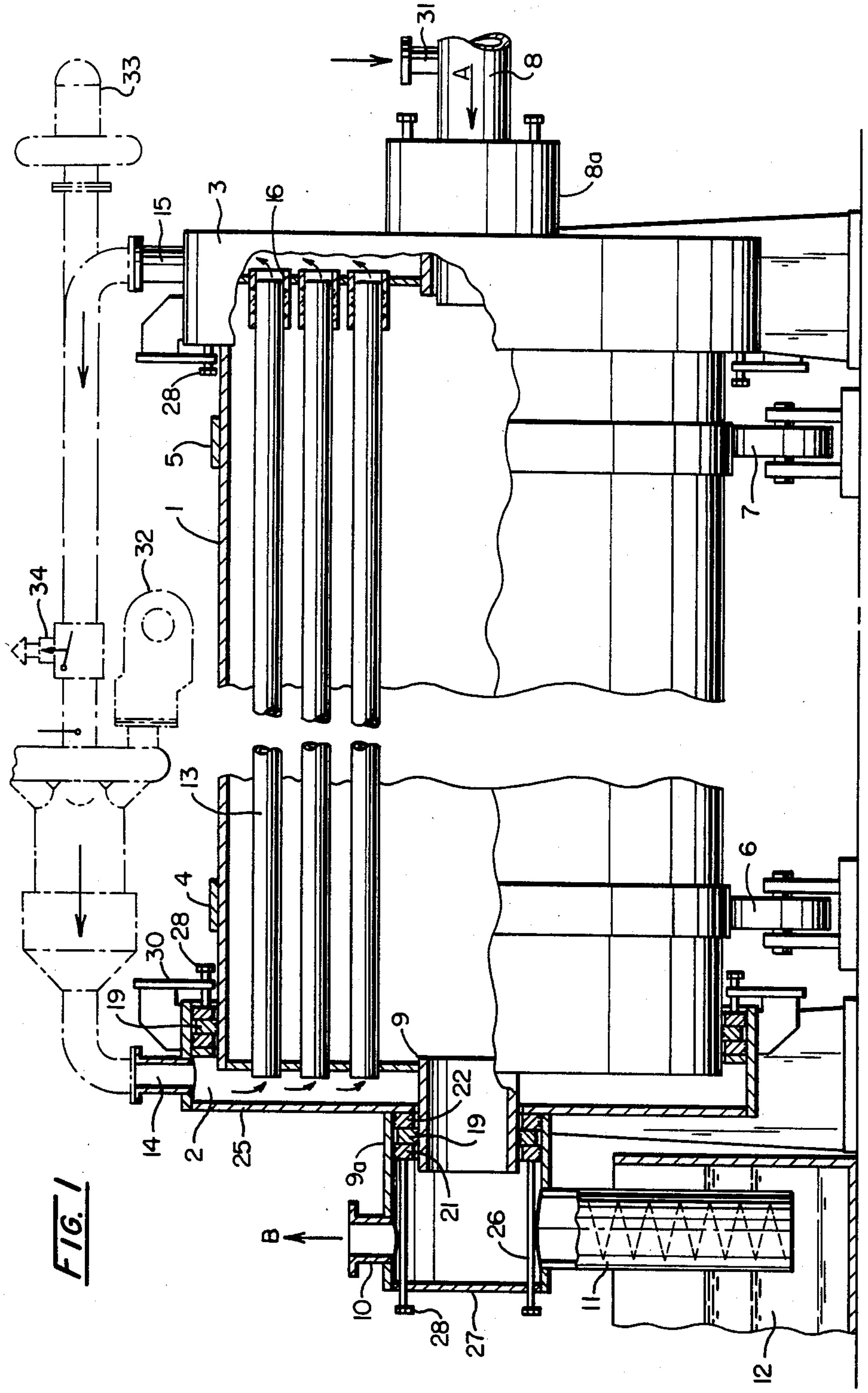
FIG. 1 is an elevational view of a pyrolysis drum in accordance with one embodiment of the invention, wherein some parts are shown in cross section.

A rotary pyrolysis vessel or drum 1 is generally shown in FIG. 1. A first gas collecting chamber 2 is disposed at the exit end of drum 1, where one would remove any coke and other residual solids. A second gas collecting chamber 3 is disposed at the other end of the pyrolysis drum 1, where material to be treated in the drum is introduced.

Support for the drum and drive attachments are provided by two rings 4 and 5 which are fixed to the drum. Ring 4 cooperates with roller 6, and ring 5 cooperates with roller 7. The rollers 6 and 7 are rotated by any desired means.

Comminuted and compacted refuse or waste material in granular form which has been dewatered is introduced into the pyrolysis drum by being moved in the direction of arrow "A" through a feed conduit 8 mounted in housing 8*a*. The pyrolysis gas is removed at the opposite or exit end of pyrolysis drum 8 through a hollow connection member 9 mounted in housing 9*a*, and then through gas conduit 10 (arrow "B"). The solid pyrolysis residue is moved through an exit conduit with stuffing screw 11 into a quench bath 12, e.g., a water bath. Absence of air is effectively ensured by the quenching medium. The granular material may be introduced by an airtight bucketwheel charging valve, or similar means allowing controlled feeding of the material into the drum.

At each one of the two end faces of the drum 1, a plurality of bores or similar passages is provided, and tubes 13 or similar pipes or conduits extend through the bores. The tubes 13 extend parallel with respect to the longitudinal axis of the drum 1 and through the interior of the drum. Heating gas, which has been heated, for example, by a burner 32, to a temperature in the range of from about 600° C. to approximately 700° C., enters through an inlet conduit 14 into first gas collecting chamber 2 and then into the tubes 13. The gas enters into the second gas collecting chamber 3 after completing its movement through the tubes 13 whereby it is cooled. The removal or withdrawal of cooled gas is achieved by an exit conduit 15, and it is then added again to the circuit under the influence of a blower or ventilator 33, see FIG. 1. A by-pass valve means 34, or similar relief means, is provided for the withdrawal of excess air.

Figure 4:
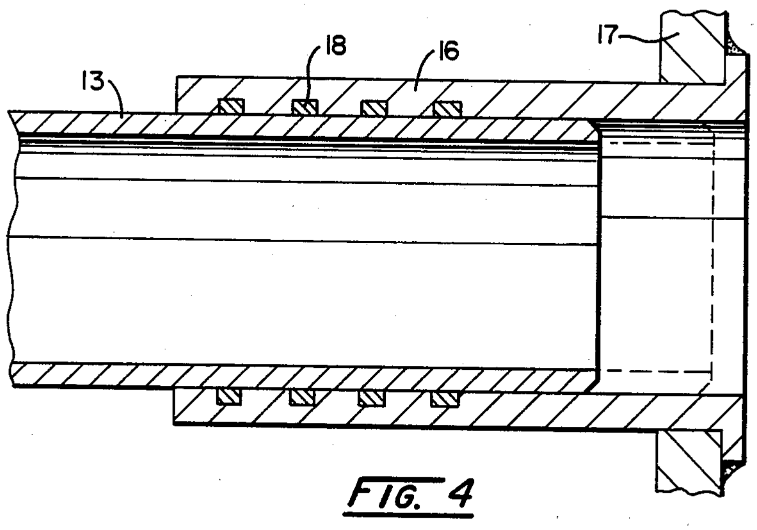
FIG. 4 is a detail view of a heating conduit movably mounted to the end wall of the pyrolysis drum.

For control of the various expansions, the tubes 13 are each fixed, for example, by welding, at the inlet side, i.e., at the first collecting chamber 2 shown at the left side in FIG. 1, but are movably disposed in sleeves 16 at the opposite or material input side, i.e., at the second collecting chamber 3 shown at the right side in FIG. 1. The movable joining is indicated in greater detail in FIG. 4. The sleeve 16 is fixed in a passage in the end face or wall 17 of drum 1. Several seal rings 18 are interiorly provided in the sleeve 16, with four seal rings being shown in sequential arrangement. As is indicated in dash lines, the tube 13 can be moved in axial direction without danger of leakages, tension bridging, or similar undesired conditions.

For controlled or metered addition of water when the dry content is too high, and/or for air input for initiation of the combustion process, an inlet conduit 31 is provided at that end of the drum 1 at which the second collecting chamber 3 is arranged (FIG. 1).

Figure 2:
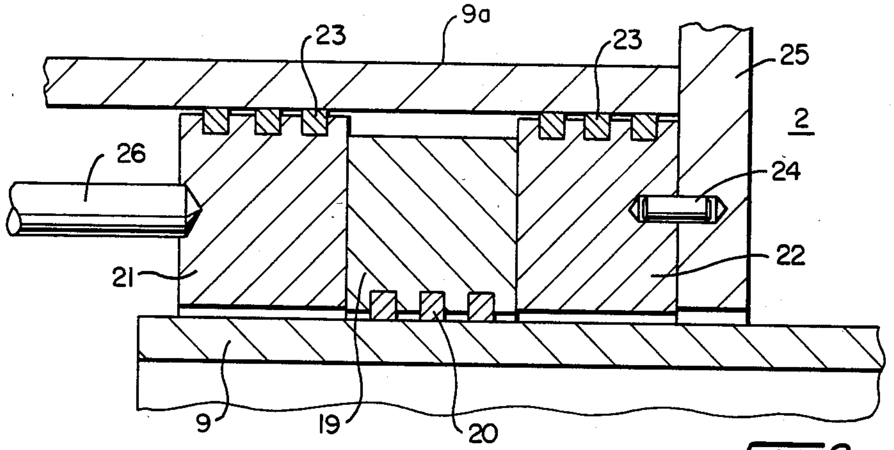
FIG. 2 shows a seal arrangement for the pyrolysis drum circle "X" of FIG. 1 but in a larger scale.
Figure 3:
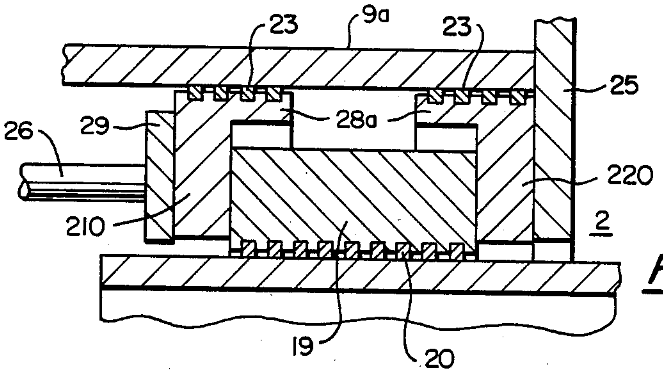
FIG. 3 is a view similar to FIG. 2 of a different seal arrangement.

A seal arrangement for sealing the drum 1 with respect to the atmosphere, and the gas collecting chambers 2 and 3, respectively, is provided and this is shown in greater detail in FIGS. 2 and 3 which are drawn at a larger scale than FIG. 1.

FIG. 2 shows an enlarged view of the seal arrangement at one end of pyrolysis drum. At the hollow connection member 9 a seal disc 19 is mounted which can be made of cast iron. Three seal rings 20 are provided in interior relationship with respect to the disc 19, and these seal rings are pressed onto the outer wall of the hollow connection member 9. Because the seal disc 19 rotates with the hollow connection member 9, there is no dynamic loading or stressing of the sealing rings 20.

A first or forward contact ring 21 and a second or rearward contact ring 22 are respectively abuttingly held against the faces of seal disc 19. These contact rings may be made of steel. Both rings are respectively furnished with several outer seals or seal rings 23, which are positioned sequentially alongside one another, and these seals 23 are also not subjected to dynamic loading because the contact rings 21 and 22 are stationary. Thus, the second contact ring 22 is held in place by way of a lock pin 24 which extends into a bore in the rearward wall 25 of the first gas collecting chamber 2 with its one end, whereas the opposite end extends into a corresponding bore in the contact ring 22.

A threaded rod 26 is threaded into a correspondingly threaded and countersunk bore in the rearward wall 27 (FIG. 1) of housing 9*a*. A bolt head 28, or similar control sleeve, serves as adjustment member of the assembly. For maintaining a uniform contact pressure against the seal disc 19, one would arrange several of the threaded rods about the circumference of the annular assembly. Thus, the threaded rods 26 serve to vary and adjust the operative contact pressure of the first contact ring 21 against the seal disc 19 and, accordingly, the degree of sealing. The contact rings 21 and 22 are arranged with play with respect to the hollow connection member 9. As is evident, in this manner an effective seal of the gas collecting chamber with respect to the interior of the drum 1 is achieved. The dynamic sealing is achieved at both end faces of the seal disc 19 with respect to either one of the contact rings 21 and 22. The advantage of the invention resides in the durable and substantially maintenance-free seal of drums which rotate with a low number of revolutions and under low pressure conditions.

FIG. 3 shows a seal arrangement at a reduced scale in which the sealing movements of the static seals are larger. As can be seen, this is achieved thereby that the contact rings 210 and 220 have the configuration of the inverted letter "L". The two horizontal legs 28*a* are facing one another, and seals 23 are exteriorly provided on the legs. Because of the inverted-L configuration, more seal rings can be placed thereon and in adjoining manner with respect to one another, for ensuring an effective seal.

A seal disc 19 is disposed beneath the two legs 28*a*, and this can again be wider and, consequently, can retain a greater number of seal rings 20 in adjoining or adjacent attitude with respect to one another, on the inner circumference.

In this embodiment the threaded rod 26 cooperates with an intermediate disc member 29, and the contact pressure or force of the two contact rings 210 and 220 against the seal disc 19 can be controlled in this manner.

The seal assemblies described with reference to FIGS. 2 and 3 are also provided on the opposite input side, for sealing the gas collecting chamber 3. Additionally, such seal assemblies may also be employed for sealing of the chambers 2 and 3 with respect to the atmosphere. For such posssibility, as is schematically indicated at 30 in FIG. 1, the seal disc 19 is arranged about the outer circumference or wall of the drum 1. An identical seal can be provided at the opposite side, i.e., on right-hand side of FIG. 1. The bolt heads 28 serve to precisely adjust the seal in an manner analogous to that described.

Reference in this disclosure to details of the specfic embodiments is not intended to restrict the scope of the appended claims, which themselves recite those features regarded as essential to the invention.

I claim:

1. In an apparatus for subjecting a particulate feed material of household, industrial and the like refuse to pyrolysis comprising a rotatable cylindrical pyrolysis drum having opposite end walls; a stationary cylindrical gas collecting chamber at each end of and coaxial with said drum, each collecting chamber comprising inner and outer walls the inner wall also being the respective drum end wall; a plurality of heating gas conduits extending through said drum the opposite ends of which are supported in the opposite end walls of said drum, said conduits providing communication between said gas collecting chambers; and means external to said drum providing communication between said gas collecting chambers, the improvement which comprises: a coaxial hollow cylindrical housing integral with the outer wall of each gas collecting chamber, said housing being of smaller diameter than said drum; a coaxial hollow connecting member integral with each end wall of said drum extending into its respective cylindrical housing thereby providing means for introducing feed material into one end of said drum and for removing pyrolysis products from the other end; sealing means between each connecting member and its respective cylindrical housing comprising a seal disc within said cylindrical housing mounted on the outer circumferential surface of said connecting member, said seal disc having at least two seal rings in contact with said connecting member circumferential surface; two contact rings within said cylindrical housing mounted on the inner circumferential surface of said cylindrical housing and in abuting relation with the oppiosite ends of said seal disc, each of said contact rings having at least two seal rings in contact with said inner cylindrical surface; and a threaded rod within said cylindrical housing the rearward end of which is mounted in the rearward wall of said cylindrical housing and the forward end of which cooperates with one of said contact rings whereby pressure can be placed on said seal disc.

2. The improvement according to claim 1 in which the other contact ring is secured to the outer wall of its respective gas collecting chamber.

3. The improvement according to claim 1 in which each of said contact rings is in the shape of an inverted "L" with the horizontal legs thereof directed toward each other, said seal disc being positioned beneath said horizontal legs.

4. The improvement according to claim 3 in which said seal rings of said contact rings are positioned in the horizontal legs thereof.

* * * * *